Patented June 29, 1954

2,682,460

UNITED STATES PATENT OFFICE 2,682,460

ARTICLE OF MANUFACTURE FOR CLEANING AND POLISHING HARD SURFACES

Earl R. Carper, San Francisco, Calif.

No Drawing. Application April 5, 1950,
Serial No. 154,209

7 Claims. (Cl. 51—307)

This invention and discovery relates to the product and the method of impregnating tough porous paper and other fibrous material with a chemical powder substantially in accordance with the following formula:

| | |
|---|---|
| Silica | 73.18 |
| Alumina | 15.46 |
| Iron oxide | 1.09 |
| Lime | 1.37 |
| Magnesia | .36 |
| Sulphuric anhydride | .71 |
| Alkalies | 3.66 |
| Loss on ignition | 4.17 |
| | 100.00 |

An object of the invention is the provision of a sheet of fibrous material having a relatively high capacity to absorb liquid and mechanical masses dislodged by the chemical and attrition qualities of the above formula permeating the fibers of the sheet, when applied to the surface to be cleaned.

For example when the impregnated sheet is rubbed against the surface of glass the chemicals of the formula have an affinity for the elements forming a film on the surface of the glass, and causing the adherence of dust, moisture and other discolorations. These substances are removed from the glass by chemical reactions and the attrition of the abrasive elements of the formula and are picked up by the porous body of the sheet.

For instance the windshield of an automobile may be coated with a film of accumulated matter such as hydrocarbon oil vapors, smoke, mud, the juices of smashed insects and the like, often baked thereon by the sun and the dehydrating qualities of vehicle speed.

Common experience proves that former chemicalized cloth and paper rubbing sheets fail to clear film from glass and tend rather to smear the surface with streaks that the sheets fail to pick up. This failure is due largely to the inefficiency of both the chemical formula often containing glycerine and a nonabsorbent quality of the sheet.

In the present invention the formula will dissolve or disintegrate practically every accumulated deposit on a windshield glass when used wet, because the formula is applied to the glass with the ingredients of the formula in solution and suspension. It modifies the structure and the chemistry of the deposit in such a manner that it has a strong affinity for the impregnated paper when moist. After the moist treatment, a similar sheet is used to dry and polish the surface. During the dry rubbing action an electrostatic field is created which attracts all loose dry particles to the sheet, with the result that the glass or other hard surface is cleared of all particles which will respond to the attraction, leaving the surface free of every particle of matter not adhesively fixed to the surface.

It will be noted that the present formula and the sheet are free from glycerine and other hygroscopic ingredients which tend to leave smears and traces upon glass and other surfaces.

The above formula is commercially known as pumicite and more particularly as Fresno pumicite and Friant pumicite. It is a natural stratified deposit of volcanic origin naturally responding to a 325 mesh screen without grinding. It is processed for the present use only to remove coarser sands, organic and other matter that may have drifted into it over ages of time. It is purified by putting it in suspension in sufficient water to stratify the organic matter by flotation and to precipitate the heavier and coarser particles. The desired grade in agitated suspension is syphoned off below the organic stratum and above the precipitated stratum.

At present the preferred form of paper for the combinative sheet is known as paper toweling which comes in different grades with different characteristics of toughness and absorbent qualities. That preferred is commercially known as sulphite, sulphate and unglazed Kraft paper which have considerable strength and toughness when wet. A crepe-like structure is advantageous in accumulating matter removed from the surface being rubbed.

The preferred and cheaper mode of mass production of the present article of manufacture is to introduce the formula in agitated water suspension or slurry into the pulp line of the paper mill producing paper toweling or the like, preferably by spraying it onto the pulp on the moving felt mat where it will be thoroughly mixed and distributed in the pulp flow. The proportions may be chosen to meet special results desired, such as twenty to fifty percent more or less, in the pulp by dry weight.

When the formula impregnated pulp has passed through the ultimate processing of screening, drying, rolling, cutting and folding, the final sheets combine the structure of the paper with the elements of the formula which react to the elements of the pulp or combine mechanically with the structure of the finished sheet, which is then ready for use in accordance with this invention.

It is important that the cellulose pulp formula be such that the finished sheets will not "lint" or give off residual fibers when rubbed or handled. It is equally important that the paper be not overloaded with the mineral formula so that it will not "dust" or give off dry powder when in use.

It is also practical to impregnate finished paper sheets by submerging them in an agitated water bath having the mineral formula in suspension, then drying the sheets in the usual paper mill practice.

Where the basic paper mill practice of impregnating the flowing pulp is not available, the usual packages of interfolded paper towels for dispensing machines may be impregnated by dipping one end of the assembled package into an agitated solution of the pumicite. The solution absorbed by the wet end will creep by capillary attraction into the sheets. The excess moisture may then be dispersed by dehydration or evaporation. In use the impregnated end of the sheet is moistened and applied to the surface to be cleaned. The wet end may be torn off and the dry portion of the sheet used to polish the cleaned surface. While this method is more costly it gives an entirely satisfactory product without the investment represented by a paper mill.

The above general formula also contains zeolite, rare earth and residual elements incidental to flooding, evaporation and changes incidental to ages of exposure to atmospheric conditions, together with chemical reactions that may occur when added to the chemical conditions of the paper vehicle when wet.

The formula given in the preamble above is for identification of the deposit commercially known as Fresno-Friant pumicite. The preferred material for the present invention is a substratum of the above pumicite, identified by its slightly pink rouge color and its fine division of particles, about 98% of which will freely pass through a 325 screen. In fact the particles are so fine that it cannot be easily hand shoveled, yet it retains the abrasive qualities of silica without danger to glass and metal surfaces being polished with the treated sheets. All of the essential elements of the general formula are found in this rouge substratum, but in a more highly refined natural condition, including zeolite, rare earth and the like in subsidiary relation to the other elements identified in the general formula.

For identification in the present disclosure and claims this substratum will be defined as "monorouge" which has a loss on ignition of about 4.58%, and a retained grit of .005% 200 mesh, composed of cinderlike material, quartz and some mica and the general characteristics of the above pumicite from which it is derived.

The invention operates substantially as follows: A windshield with minor accumulation of oily exhaust film and traffic dust may be wiped clean with a few strokes of the impregnated dry paper. But a very dirty windshield with dehydrated smashed bugs added to the exhaust film and dirt sunbaked on the glass, makes it necessary to wet the paper a moderate amount and rub it across the glass with sufficient pressure to squeeze the water and combined chemicals from the paper. This solution immediately dissolves the film from the glass and the accumulated matter is picked up by the texture of the wet paper, which is then discarded. The cleared glass, still moist, may then be polished with a clean sheet of the same paper.

The windshield has been chosen as presenting perhaps the worst condition to be corrected. The paper treated in accordance with this invention may be used wet or dry in polishing glass articles, hard varnished surfaces, and for cleaning and polishing chrome plated automobile bumpers, jewelry, silverware and home fixtures.

Automobile service stations at present depend upon laundered rags, squirt guns, and sponges involving the costs of rags and laundering, the extra labor and delays, resulting in smeared glass and unsatisfactory results generally. Whereas the present paper means is cheap and may be discarded with economical and satisfactory results.

I am aware that it is common practice to add various clays, and natural minerals to wood pulp in the process of paper fabrication for a different purpose, but so far as I am aware the present formula has never been combined with this particular form of paper for the present objectives.

Having fully described this invention and its mode of operation, what I claim and desire to secure by Letters Patent is:

1. An article of manufacture comprising a sheet of porous paper impregnated with from 10% to 25% of Friant Formation natural pumicite having a formula substantially as follows:

| | |
|---|---:|
| Silica | 73.18 |
| Alumina | 15.46 |
| Iron oxide | 1.09 |
| Lime | 1.37 |
| Magnesia | .36 |
| Sulphuric anhydride | .71 |
| Alkalies | 3.66 |
| Loss on ignition | 4.17 |
| | 100.00 |

2. An article of manufacture comprising a sheet of porous fabric impregnated with from 10% to 25% of Friant Formation natural pumicite defined above as "monorouge."

3. An article of manufacture comprising a sheet of porous cellulose material such as paper toweling, impregnated with Friant Formation natural pumicite, defined above as "monorouge," in solution in substantially the proportions of ten to twenty-five percent of monorouge to paper by weight when dry.

4. An article of manufacture comprising a relatively soft, absorbent cellulose fiber toweling material and dispersed therein, Friant Formation pumicite as it exists in nature of mildly abrasive, porous character, said pumicite being present in amount sufficient to impart substantial abrasive qualities to said absorbent toweling material, said pumicite also being in a finely divided state such that substantially all will pass a 325 mesh sieve and consisting for the most part of particles having sharp edges.

5. An article of manufacture comprising a sulfite paper toweling material and, dispersed therein, a mineral in its natural state known as Friant Formation pumicite of mildly abrasive, porous character, said mineral being present in an amount not to exceed 10% to 25% by weight of said paper sufficient to impart substantial abrasive qualities to the absorbent material, said mineral also being in a finely divided state such that substantially all will pass a 325 mesh sieve and consisting for the most part of particles having sharp edges.

6. An article of manufacture comprising sulfate paper toweling and, dispersed therein, a mineral in its natural state known as Friant Formation pumicite of mildly abrasive porous character, said mineral being present in an amount not to exceed 10% to 25% by weight of said paper sufficient to impart substantial abrasive qualities to the absorbent material, said mineral also being in a finely divided state such that substantially all will pass a 325 mesh sieve and consisting for the most part of particles having sharp edges.

7. An article of manufacture comprising a relatively soft, absorbent Kraft paper toweling and, dispersed therein in a quantity not to exceed 10% to 25% by weight of said paper sufficient to impart substantial abrasive qualities to the paper natural Friant Formation pumicite having in its natural state a size distribution such that substantially all will pass through a 325 mesh sieve and consisting for the most part of particles having sharp edges, said natural pumicite having the property of scoring plastic materials and polishing but not scoring glass and other materials of similar hardness.

References Cited in the file of this patent

UNITED STATES PATENTS

| Number | Name | Date |
| --- | --- | --- |
| 42,450 | Derburgh | Apr. 19, 1864 |
| 135,153 | Paper | Jan. 21, 1873 |
| 332,028 | White | Dec. 8, 1885 |
| 1,631,757 | Peck | June 7, 1927 |
| 1,690,960 | Yamanka | Nov. 6, 1928 |
| 2,333,919 | Flaxman | Nov. 9, 1943 |
| 2,375,585 | Rimer | May 8, 1945 |
| 2,386,066 | Schlaback | Oct. 2, 1945 |